Oct. 4, 1960   J. LA MOTTE SHAW ET AL   2,955,251
GEOPHYSICAL EXPLORING
Filed March 21, 1958   4 Sheets-Sheet 1
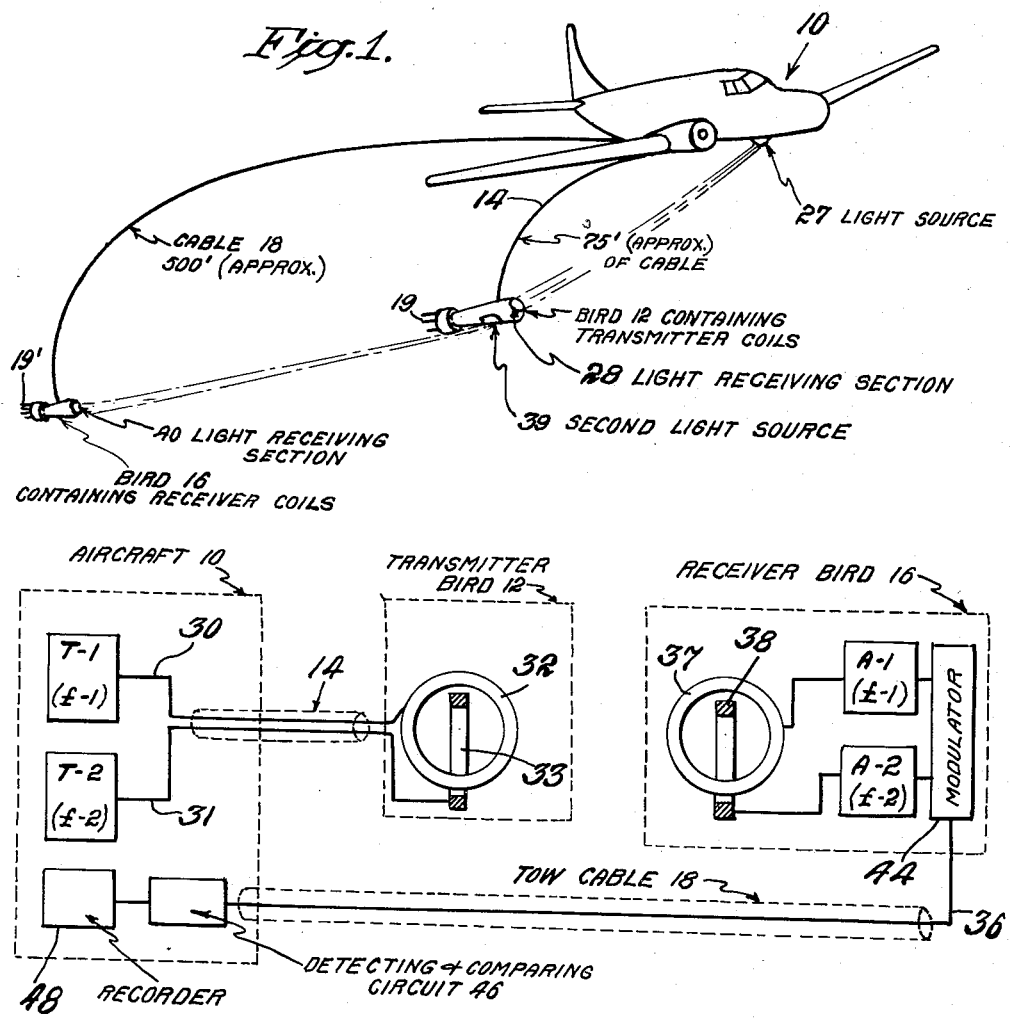
INVENTORS
JOHN LA MOTTE SHAW
RONALD REX TAYLOR
BY
ATTORNEY Oct. 4, 1960  J. LA MOTTE SHAW ET AL  2,955,251
GEOPHYSICAL EXPLORING
Filed March 21, 1958

INVENTORS
JOHN LA MOTTE SHAW
RONALD REX TAYLOR

BY
ATTORNEY

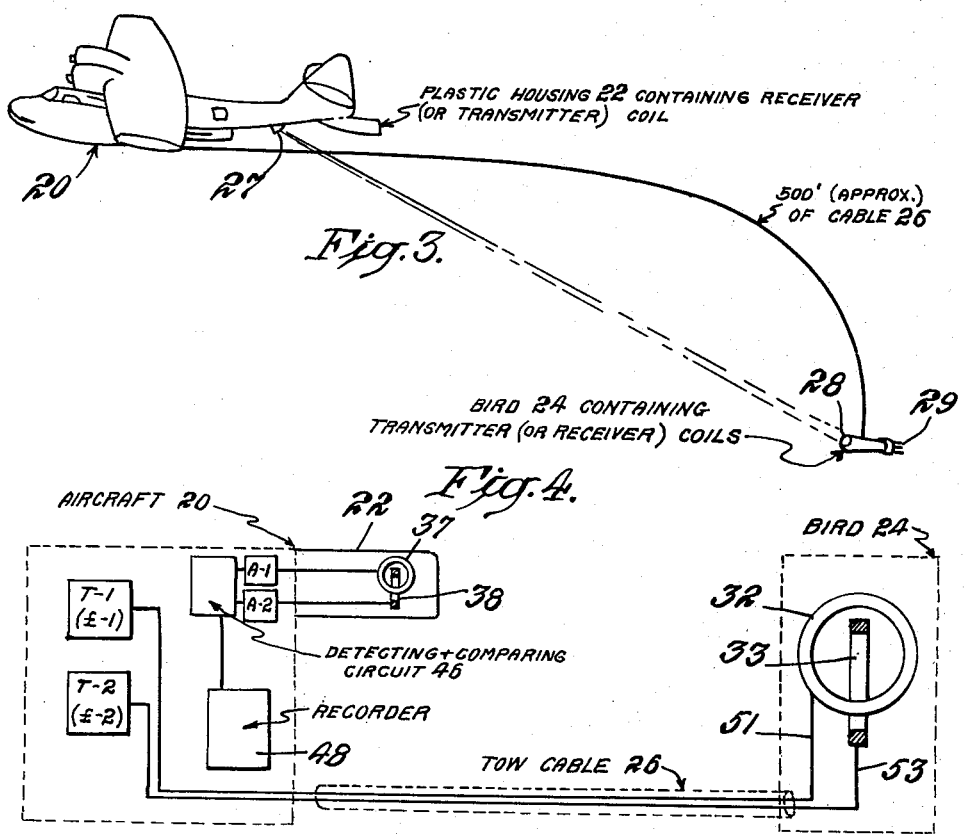

Oct. 4, 1960     J. LA MOTTE SHAW ET AL     2,955,251
GEOPHYSICAL EXPLORING
Filed March 21, 1958     4 Sheets-Sheet 4
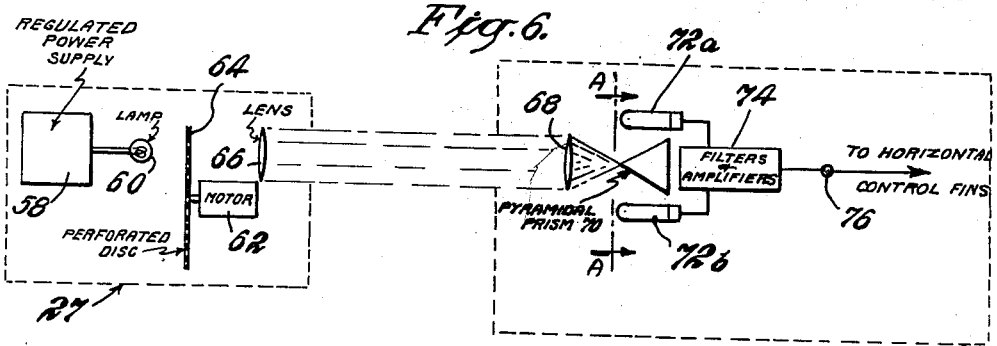
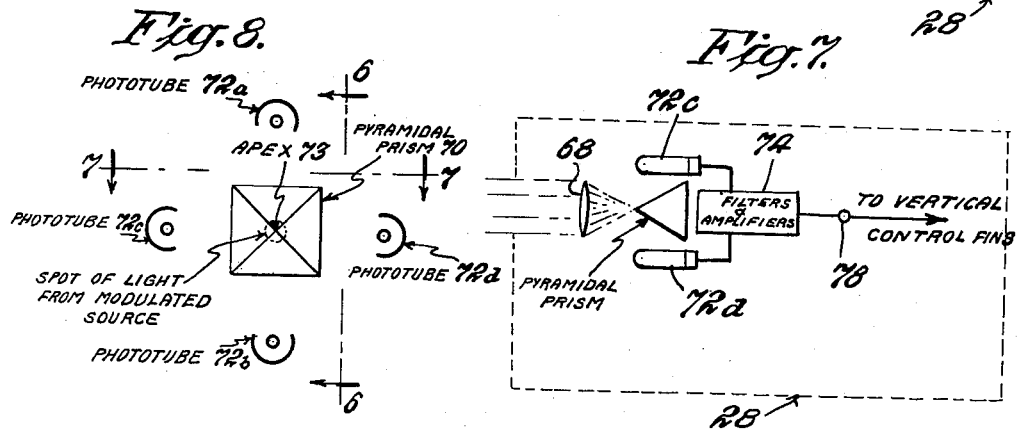
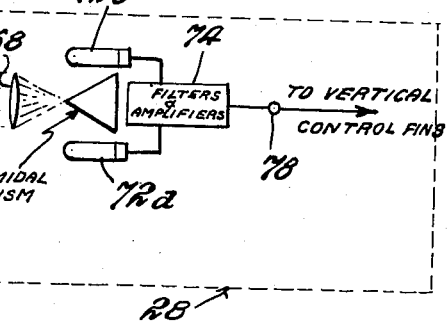
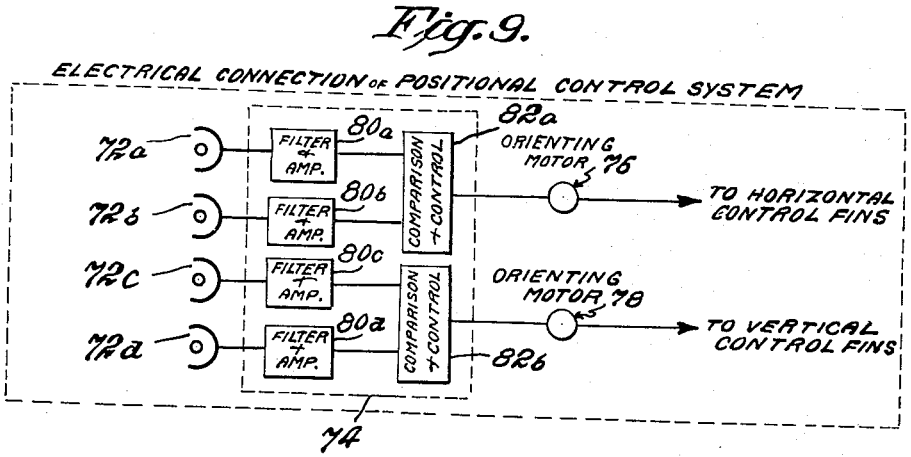
INVENTORS
JOHN LA MOTTE SHAW
RONALD REX TAYLOR
BY
A. A. Weller
ATTORNEY

United States Patent Office 2,955,251
Patented Oct. 4, 1960

2,955,251
GEOPHYSICAL EXPLORING

John La Motte Shaw and Ronald Rex Taylor, Copper Cliff, Ontario, Canada, assignors to The International Nickel Company, Inc., New York, N.Y., a corporation of Delaware Filed Mar. 21, 1958, Ser. No. 722,954

Claims priority, application Canada Oct. 24, 1957

31 Claims. (Cl. 324—4)

The present invention relates to methods and apparatus for electrically detecting and measuring mineral bodies by airborne operations and, more particularly, to an improved electromagnetic method and to improved electrical equipment adapted for the commercial application of the aforesaid method. The method of the invention comprises creating one or more electromagnetic fields, moving the field or fields relative to an area to be investigated and detecting variations in the moving field or fields as an indication of, and a measurement for, a mineral body while maintaining a substantially constant positional relationship between the transmitting and receiving coils. Still further, it relates to a positional arrangement of the transmitting and receiving coils and means for insuring a substantially constant positional relationship between these coils to thus insure accurate detection and measurement of the mineral bodies.

As is well known to those skilled in the art, various electromagnetic methods have been employed in detecting and measuring mineral bodies by airborne operations. Certain of these prior systems and methods employ a streamlined, bomb-shaped case, called a "bird" or "bomb," towed by an aircraft, which bird contains the receiver apparatus while the cooperating transmitter apparatus is located within the aircraft. However, substantial difficulties have been encountered due to the variations in electrical signals, which variations are attributable to the movement of the bird relative to the aircraft. For example, a bird towed by an aircraft undergoes certain motion relative to the aircraft due to various disturbances such as air turbulence and variations in the speed of the aircraft. This motion of the bird relative to the aircraft changes the relative position of the receiving coils to the transmitting coils which may result in responses from other than conductive bodies confusingly similar to the type of responses that would be expected from conductive bodies.

It has now been discovered that the foregoing difficulties may be obviated by employing certain special arrangements of the transmitting and receiving coils together with special means to maintain a substantially constant positional relationship between the transmitting and receiving coils.

It is an object of the present invention to provide improved apparatus for electrically detecting and measuring mineral bodies by airborne operations.

It is another object of this invention to achieve accurate airborne electromagnetic measurements of the locations of mineral ore bodies by employing special means to eliminate positional errors developed within the ore detection and measuring system.

It is a further object of this invention to provide a special system for correction of positional variations between the transmitting and receiving coils in an airborne electromagnetic prospecting system.

It is still another object of this invention to provide an airborne electromagnetic prospecting apparatus in which the electromagnetic field transmitting means is in one airborne craft and the receiver is in a second airborne craft together with special means to maintain a substantially constant positional relationship between the two craft.

The invention further contemplates providing an improved electromagnetic method of ore prospecting.

Still another object of the invention is to provide an improved method for achieving accurate airborne electromagnetic measurements of the locations of mineral bodies.

It is also an object of this invention to provide an improved method for airborne electromagnetic prospecting in which corrections are made for positional variations between the transmitting and receiving coils.

Other objects and advantages will become apparent from the following description taken in conjunction with the accompanying drawing, in which:

Figure 1 is a diagrammatical view of one illustrative embodiment of this invention;

Figs. 1a to 1d, inclusive, are diagrammatical views depicting illustrative embodiments of the general system shown in Fig. 1.

Fig. 2 shows in schematic and block form an embodiment of an electromagnetic apparatus employed in the general system depicted in Fig. 1;

Fig. 3 depicts a diagrammatical view of another illustrative embodiment of this invention;

Fig. 4 illustrates in schematic and block form an embodiment of the electromagnetic apparatus that may be employed in the general system depicted in Fig. 3 when the transmitting coils are carried by the bird or bomb;

Fig. 5 depicts in schematic and block form an embodiment of the electromagnetic apparatus that may be employed with the general system shown in Fig. 3 when the receiving coils are carried in the bird or bomb;

Fig. 6 depicts in schematic and block form an electro-optical system that may be employed in accordance with this invention and depicts the light-responsive apparatus, including a vertically-opposed pair of light-sensitive cells, as viewed on line 6—6 of Fig. 8;

Fig. 7 illustrates the light-responsive apparatus as viewed from line 7—7 of Fig. 8;

Fig. 8 is a view of the optical pyramid and cluster of photo cells taken on line A—A of Fig. 6; and Fig. 9 depicts the electrical connections of the positional control portion of the electro-optical system of Figs. 6 and 7.

Figure 1A:
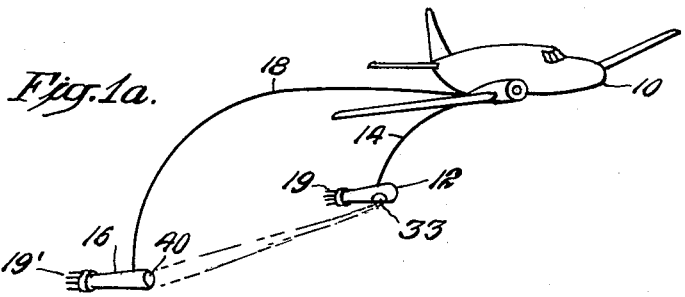

Generally speaking, the present invention contemplates an airborne electromagnetic prospecting method and apparatus therefor in which the electromagnetic field-generating coil or coils are carried by one airborne craft and the receiving coil or coils are carried by another airborne craft. The two airborne coil-carrying crafts may be moved through the air in any suitable manner. Advantageously, these coil-carrying craft may be birds or bombs (as hereinbefore defined), each trailed by a cable from a powered aircraft. However, one of the coil-carrying craft may be a powered aircraft with the other constituting a bird or bomb towed on a cable from the powered aircraft. Preferably, a dual-frequency method of airborne prospecting is used which comprises radiating electromagnetic fields from a pair of mutually orthogonal transmitting coils and receiving the responses with a pair of mutually orthogonal receiving coils in which one transmitting coil and one receiving coil are coplanar and the other pair are coaxial. Although the dual frequency method does compensate for limited relative movements between the transmitting and receiving coils, it has been found that deviations beyond these limited relative movements do occur sufficiently often to restrict surveys to fairly smooth flying conditions and may adversely affect the accuracy of the results even under satisfactory flying conditions. Since the birds are inherently less stable than the heavier powered aircraft, the double trailing system, i.e., with the transmitting coils in one bird and the receiving coils in a separate bird, makes the occurrence of these larger deviations all the more likely. Preferably, a special independent error or positional control system is provided to bring these movements within satisfactory limits and to maintain receiver-transmitter alignment.

Referring now to Fig. 1, there is depicted an aircraft 10 towing a first bird 12 by means of a relatively short tow cable 14 and also towing a second bird 16 by means of a relatively long tow cable 18. The first or leading bird 12 may advantageously contain the transmitting coil or coils for generating the electromagnetic fields. The first bird 12 is towed at a short distance from the aircraft, for example, about 75 feet, so the transmitting coil or coils in the first bird may radiate one or more electromagnetic fields which will be substantially unaffected by the metallic structure of the aircraft. The relatively heavy transmitters or power sources for energizing the transmitting coil or coils may be carried in the aircraft to minimize the weight of the transmitting coil-carrying bird and thus reduce the size of tow cable 14 required to suspend the bird. The length of cable 14 is also maintained relatively short to minimize the transmission losses in the electrical conductor connecting the transmitters or power sources and the transmitting coil or coils, which conductor is located in cable 14. The receiving coil or coils may be located in the second bird to receive the variations in the generated electromagnetic fields due to the presence of various bodies in the earth. Although for the reasons pointed out hereinbefore it is advantageous to have the transmitting coils in the first or leading bird 12, if desired the receiving coils may be carried in the leading bird 12 and the transmitting coils carried in the second or trailing bird 16.

Referring now to Fig. 2, there is depicted in block form, an electromagnetic system that may be employed in conjunction with the two-bird system as shown generally in Fig. 1. The aircraft may contain the transmitters or power sources for energizing the transmitting or electromagnetic field radiating coil or coils. The transmitting coil or coils may be carried in a bird towed by the aircraft. As illustrated diagrammatically in Fig. 2, the aircraft is indicated generally by block 10 and it may contain a pair of transmitters or power sources T-1 and T-2 for energizing a pair of transmitting coils 32 and 33 individually connected by conductors 30 and 31 extending through tow cable 14 to transmitting coils 32 and 33, respectively. The transmitting coils 32 and 33, as shown in Fig. 2, may be orthogonally positioned with respect to each other in the first bird 12. The receiving coil or coils may be carried in a second bird, indicated generally by block 16, and may include a pair of orthogonally positioned receiving coils 37 and 38. Receiving coil 37 may be positioned in coplanar relationship with the transmitting coil 32. The receiving coil 38 and its corresponding transmitting coil 33 may be oriented coaxial with each other. The transmitting and receiving coils are thus arranged in relation to each other so errors due to relative motion between them are minimized. Advantageously, one set of transmitting and receiving coils 32 and 37 operate at a frequency $f-1$ and another pair of transmitting and receiving coils 33 and 38 operate at a different frequency $f-2$. The frequencies used are within the range of near zero to about 20,000 cycles per second and are selected from within this range to give the best compromise between weight and performance. The factors that are applied in a general way are listed below:

(1) A low frequency is preferable in prospecting for good sulfide conductors.

(2) The lower the frequency, the larger and heavier is the equipment which must be carried.

(3) Separation of the two frequencies must be sufficient for the satisfactory filtering of one from the other.

(4) One frequency is preferably not a harmonic of the other.

(5) When employing a helicopter, rotor modulation should be considered. For example, a four-bladed rotor turning at 600 r.p.m. would have a rotor modulation of 40 cycles per second (c.p.s.) ($4 \times 600/60$). Accordingly, the frequencies used would be selected from within the foregoing range to minimize any effect of this rotor modulation.

(6) Mechanical resonances may be avoided by design of the structure to stay out of detecting frequency range.

A first amplifier A-1 is shown connected to receiving coil 37 and a second amplifier A-2 is shown connected to receiving coil 38. The output of amplifiers A-1 and A-2 may be impressed on an electrical carrier wave in a modulator 44 to facilitate transmission of the signal along the tow cable to the aircraft. In the amplifiers A-1 and A-2 the signals from coils 37 and 38 due to each of the electromagnetic fields including the responses due to earth formations are applied at a level high enough to operate the modulator 44. It is also desirable to have A-1 and A-2 as a combined amplifier amplifying both signals simultaneously so that variations in gain are canceled. The modulated electrical carrier wave output of modulator 44 is transmitted by the electrical conductor 36 in tow cable 18 to a detecting and comparing circuit 46, preferably located within the aircraft 10. In the detecting and comparing circuit 46, the signals from amplifiers A-1 and A-2 are detected and separated from the electrical carrier wave and compared. The output of the detecting and comparing circuit 46 may be, if desired, connected to a suitable recorder 48, also preferably located in the aircraft 10.

As pointed out hereinbefore, although the aforementioned dual frequency method of electromagnetic airborne exploration does compensate for some relative movements between the transmitting coils and the receiving coils, it has been found that deviations beyond such limited relative movements do occur sufficiently often to restrict surveys to fairly smooth flying conditions and may adversely affect the accuracy of the results even under satisfactory flying conditions. The occurrence of these larger deviations are all the more likely to occur in the double trailing system as depicted in Figs. 1 and 2 wherein the transmitting coils are in one bird and the receiving coils are in a separate bird. It has been found desirable to provide a special error or positional control system, independent of the foregoing electromagnetic exploration system exemplified by Fig. 2, to bring these relative movements of the coil-carrying craft within satisfactory limits and generally to maintain receiver-transmitter alignment. Preferably, the error or positional control system comprises a special electro-optical system as will be explained in detail hereinafter.

The most preferred electro-optical system for the error correction or positional control apparatus for the double trailing airborne exploration system is depicted generally in Fig. 1. A source of light 27 is located at a convenient position in or on the aircraft 10. A receiving section 28 of the electro-optical system is located preferably in the first bird 12. The light source 27 is arranged to direct a beam of light from the aircraft 10 at the light receiving section 28 in the first bird 12. Advantageously, the source of light 27 includes means for modulating the light beam, and the light receiving section of the electro-optical system is constructed to distinguish between the modulated light from source 27 and other light from other sources, such as sunlight or reflections. The light receiving section 28 of the electro-optical system which is located in bird 12 may be connected through suitable mechanical and electrical means to the control fins 19 of this bird in such a manner as to actuate control fins 19 to maintain a relatively constant positional relationship between the first bird 12 containing the transmitting coil and the powered aircraft 10. The light sensitive devices of the section 28 of the electro-optical system, which may advantageously be photo cells or photo multipliers, are preferably located in the forward end of the first bird 12 and may advantageously be located on the upper surface of the forward end of the bird. A second and similar electro-optical system is used to control the bird 16 containing the receiving coils from the transmitting coil-containing bird 12. A second light source 39 is located in the first bird 12 and a second light receiving section 40 is located in the second bird 16. The second light source 39 is arranged in bird 12 to direct a light beam, which advantageously may be a modulated light beam, at the second light receiving section 40 in second bird 16 containing the receiving coils. The second light receiving section 40 in bird 16 is connected through suitable mechanical and electrical means to the control fins 19' of this bird in such a manner as to actuate these control fins 19' to maintain a relatively constant positional relationship between the first and second birds and hence between the transmitting coils 32 and 33 and their respective receiving coils 37 and 38. It should be understood that where a high degree of control is not required, it may be sufficient to control the bird 16 containing the receiving coils from a light source in the bird 12 containing the transmitting coils without controlling the bird 12 containing the transmitting coils from a light source in the aircraft 10 as depicted in Fig. 1a. However, under turbulent air conditions the variations of the bird 12 containing the transmitting coils might be excessive and this might put a severe strain on the ability of the bird 16 containing the receiving coils to follow the oscillations of the bird 12 containing the transmitting coils.

Figure 1B:
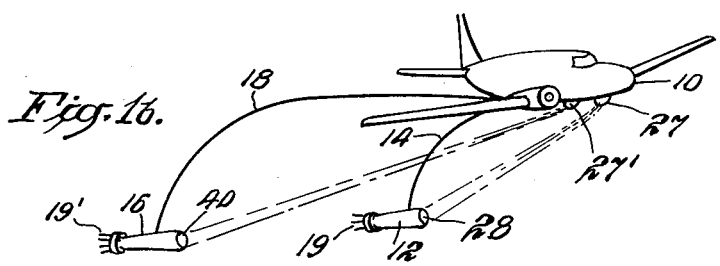

Another preferred arrangement of the electro-optical error correction or positional control system is shown in Fig. 1b. This arrangement involves providing two light sources 27 and 27', of the type previously described, suitably mounted in the powered aircraft 10 and with each light source arranged to direct a modulated light beam at a separate one of the two light receiving sections 28 and 40 located, respectively, in the transmitting coil-containing bird 12 and in the receiving coil-containing bird 16.

Figure 1C:
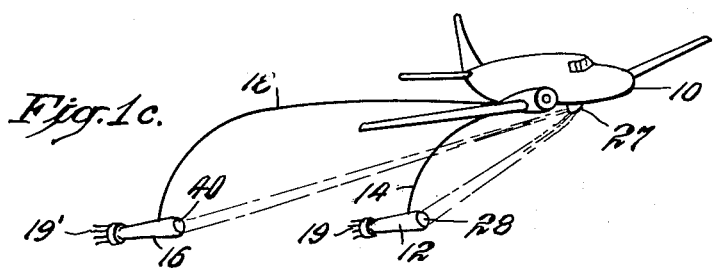

In a further desirable embodiment of the electro-optical error correction or positional control system illustrated in Fig. 1c, the single light source 27 located at the aircraft 10 is utilized to direct separate beams of modulated light at the light receiving section 28 in the bird 12 and at the light receiving section 40 in the bird 16. Thus, each of the birds is separately maintained in relatively constant positional relationship between the aircraft 10 and the bird.

Figure 1D:
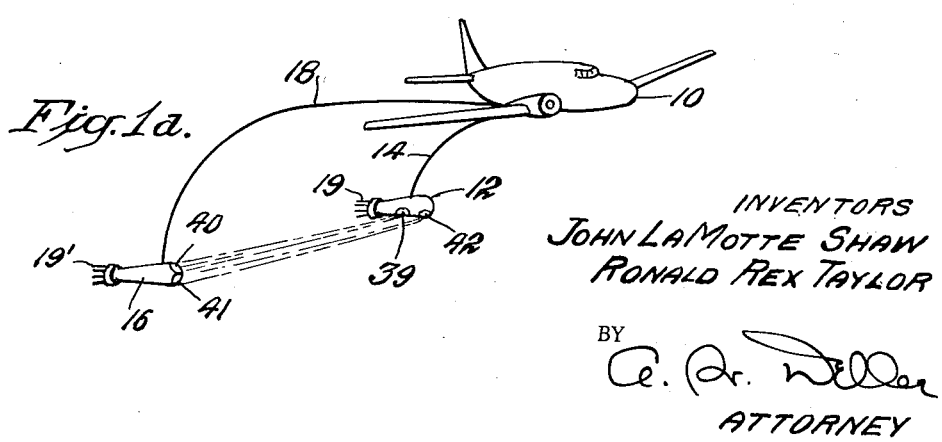

A further suitable embodiment of the electro-optical error correction or positional control system includes both control of the receiving coil alignment with respect to the transmitting coils and transmitting coil alignment with respect to the receiving coils as shown in Fig. 1d. In this embodiment a light source 39 in the transmitting coil-containing bird 12 directs a modulated light beam at a light receiving section 40 of the electro-optical system located in the receiving coil-containing bird 16 to control the positional relationship of bird 16 with respect to bird 12. A second light source 41 is arranged in the second bird 16 to direct a modulated light beam at a second light receiving section 42 in the first bird 12 to provide additional control of the positional relationship of the transmitting coil-containing bird 12 with respect to the receiving coil-containing bird 16. It is understood that where complete control is not required, one of these systems can be used alone, for example, as depicted in Fig. 1a.

Fig. 3 depicts a further illustrative embodiment of the invention in which an aircraft 20 has a housing or extension 22 made of electrically non-conductive material, such as a plastic material, located, for example, below the tail section of the aircraft. This housing may contain the receiving coil or coils or, if desired, the transmitting coil or coils. Bird 24 is towed by aircraft 20 by means of a relatively long cable 26. The transmitting coils, or the receiving coils as the case may be, are located in bird 24. Advantageously, a light source 27 may be suitably located on the aircraft 20 and arranged to direct a modulated light beam at a light receiving section 28 of an electro-optical control system located in bird 24. As in the previously described embodiments, the light receiving section 28 in bird 24 is connected through mechanical and electrical means to the control fins 29 of this bird in such a manner as to actuate the control fins 29 to maintain a relatively constant positional relationship between the bird 24 and the aircraft 20 to assure accurate measurements of the presence of ore bodies. Of course, if desired, the light source 27 may be suitably positioned in the bird 24 and the light receiving section 28 of the electro-optical control system may be suitably located on the aircraft 20.

Referring now to Fig. 4, there is depicted in schematic and block form an arrangement of the electromagnetic ore detecting and measuring apparatus which may be employed in the single bird system shown generally in Fig. 3. In this arrangement, the aircraft, the plastic housing and the bird of Fig. 3 are indicated generally in Fig. 4 by blocks 20, 22 and 24, respectively. The aircarft 20 may contain the transmitters or power sources for energizing the transmitting, or electromagnetic field radiating, coil or coils located in the bird. The corresponding receiving coil or coils are suitably positioned in or on the aircraft. As indicated in Fig. 4, the aircraft 20 may contain a pair of transmitters or power sources T-1 and T-2 which are connected through conductors 51 and 53 in tow cable 26 to the transmitting coils 32 and 33, respectively, in the bird 24 to radiate electromagnetic fields at different frequencies $f$-1 and $f$-2. In this arrangement, the receiving coils 37 and 38 are located within the housing 22 at the tail section of the aircraft 20 and are electrically connected to a pair of amplifiers A-1 and A-2, which are in turn connected to a detecting and comparing circuit 46 in the aircraft. A recorder 48 may be connected to the output of the detecting and comparing circuit 46. The transmitting and receiving coils are related to each other in the same manner as in the embodiment of Fig. 2. The electrical circuits of the mineral detecting and measuring apparatus are the same as in Fig. 2, except that the modulator has been omitted. Of course, a modulator may be included as in Fig. 2 if desired. The frequencies are selected, and the airborne electromagnetic ore detecting and measuring operations are conducted, in the same manner as explained for Fig. 2.

Referring now to Fig. 5, there is depicted in schematic and block form another exemplary embodiment of the electromagnetic ore detecting and measuring system of this invention as employed in the general arrangement shown in Fig. 3. In Fig. 5 the aircraft 20, the housing 22 and the bird 24 are indicated generally by blocks 20, 22 and 24. The aircraft 20 may contain the transmitters or power sources for energizing the transmitting, or electromagnetic field radiating, coil or coils suitably positioned in or on the aircraft. The corresponding receiving coil or coils are in the bird 24. As indicated in Fig. 5, the aircraft 20 may contain a pair of transmitters or power sources T-1 and T-2 which are connected to and energize the transmitting coils 32 and 33, respectively, located in the plastic housing 22 at the tail section of the aircraft to radiate electromagnetic fields at different frequencies $f$-1 and $f$-2. Receiving coils 37 and 38 are located in the bird 24 which also contains amplifiers A-1 and A-2 connected to the receiving coils 37 and 38, respectively. The output leads of the amplifiers A-1 and A-2 are connected to a modulator 44 which is also located within the bird. The output of modulator 44 is connected through a conductor 45 contained within tow cable 26 to a detecting and comparing circuit 46 located within the aircraft 20. The output of the detecting and comparing circuit 46 may be connected to a suitable recorder 48 which also may be located in the aircraft 20. The transmitting and receiving coils are related to each other, and the parts of the mineral detecting and measuring apparatus are electrically connected to each other, in the same manner as in the embodiment of Fig. 2. The frequencies are selected, and the airborne electromagnetic ore detecting and measuring operations are conducted, in the same manner as explained hereinbefore for Fig. 2.

As disclosed hereinbefore, the various embodiments of the airborne electromagnetic exploration apparatus of this invention desirably employ an error correction or positional control system to compensate for relative movements between the transmitting and receiving coils and in general to maintain receiver-transmitter alignment, and preferably they use therefor one or more electro-optical systems, the preferred embodiment of which has been only generally described hereinbefore. Figs. 6 through 9 are now referred to for a more detailed description of the preferred electro-optical error correction transmitting-receiving coil positional alignment control system that may be employed in the various embodiments of this invention. Fig. 6 depicts the electro-optical system as including both a light source indicated generally by block 27 and a light-receiving or electro-optical light-responsive section indicated generally by block 28. The light source or block 27 is located at the craft with respect to which the position of another craft is to be controlled. The light-receiving section 28 is located at the craft whose movements are to be controlled. The light source 27 provides a beam of modulated light. This light beam is modulated in any suitable manner, for example, electrically or mechanically. Block 27 preferably includes a regulated power supply 58 connected to a lamp 60 to provide a source of light of constant intensity. A perforated disk 64 is connected to the shaft of a motor 62 which, if desired, may be connected to the power supply 58. The perforated disk 64 is positioned transversely across the path of the light from lamp 60. A suitable lens 66 is aligned in the path of the light from lamp 60 which passes through the circle of apertures in disk 64. By driving the motor 62 at constant speed and employing apertures in disk 64 which are spaced apart at equal radial angles, the light which passes through lens 66 will be interrupted or modulated at a constant rate.

The electro-optical light-responsive apparatus for receiving the modulated light from lens 66 is shown generally in block 28. Block 28 includes a suitable lens 68 to collect the modulated light and an optical light-distributing device 70. The light-distributing device 70 is a four sided regular pyramid having its axis aligned with the optical axis of lens 68. This light distributing device may be made of any suitable transparent material, e.g., optical glass, which may transmit light through its four equal inclined faces. However, if desired, the four equal inclined faces of this pyramid may have a mirror finish to reflect light from the faces, in which case of course the optical device 70 need not be made of a transparent material. This optical device 70 may be referred to throughout this description and in the claims as a "pyramidal prism." Adjacent each side or face of the pyramidal prism 70 is a light sensitive device such as a photoelectric cell or phototube. Photoelectric cells 72a and 72b, for example, are shown in Figs. 6 and 8 adjacent the upper and lower faces of the pyramidal prism 70. Photoelectric cells 72c and 72d are shown in Figs. 7 and 8 adjacent the other two faces of the pyramidal prism 70. A view of the pyramidal prism 70 and its cluster of surrounding photo cells or phototubes 72a, 72b, 72c and 72d is shown in Fig. 8. If the beam of light is focused on apex 73 of the pyramidal prism 70 so that equal light will be received by each of the four photo cells 72a to 72d, then the output signal derived from each of these photo cells will be equal. This is the normal orientation of the light-receiving section 28 with respect to the light beam when the receiving coils such as 37 and 38 are properly aligned in their preferred position with respect to the transmitting coils such as 32 and 33. The output leads of each pair of opposed photoelectric cells are connected to electric circuits shown generally by block 74 in Figs. 6 and 7 and shown more in detail in Fig. 9. Thus, the vertically-opposed pair of photoelectric cells 72a and 72b are connected to suitable electric circuits in the block 74 and the output thereof is in turn connected to a control or orienting motor 76 to operate horizontal control fins on the craft whose position is to be regulated. The horizontally opposed pair of photoelectric cells 72c and 72d are connected to suitable electric circuits in the block 74 and the output thereof is in turn connected to a control or orienting motor 78 to operate vertical control fins on the craft whose position is to be regulated. These motors 76 and 78 are provided with suitable connections to operate the control fins of the craft whose position is to be regulated. Any deviation from the normal orientation in which the transmitting and receiving coils are in proper alignment causes an increase in the light falling on one of these cells and a decrease in the light falling on the opposite photo cell which causes the appropriate motor 76 or 78 to move control surfaces that return the bird to its preferred position.

Referring now to Fig. 9, there is depicted in block form the four photo cells and the electrical control apparatus shown generally in block 28 on Figs. 6 and 7. As depicted in Fig. 9, the electrical apparatus of block 74 includes four separate filter and amplifier circuits 80a, 80b, 80c and 80d, one for each of the photo cells. These filter and amplifier circuits each include a filter (not shown in detail) which is tuned to the frequency of modulation of the light beam. The provision of a modulated light source in combination with the filters tuned to the frequency of modulation of the light source thus eliminates interference from spurious light changes, such as sunlight, reflections, etc. These electric circuits also include a first comparison and control circuit 82a connected to the outputs of the filter and amplifier of circuits 80a and 80b of the pair of opposed photo cells 72a and 72b. The output of circuit 82a is connected to the input of orienting or control motor 76, which motor in turn is connected in a suitable manner, e.g., mechanically, to the horizontal control fins of the bird. The expression "horizontal control fins" when used in this description and in the appended claims is intended to signify the fins which regulate the movement of the craft in a vertical plane. A second comparison and control circuit 82b is connected to the outputs of filter and amplifier circuits 80c and 80d of the other pair of opposed photo cells 72c and 72d. The output of circuit 82b is connected to the input of orienting or control motor 78. Orienting motor 78 is connected in a suitable manner, e.g., mechanically, to the vertical control fins of the craft. The expression "vertical control fins" when used in this description and in the appended claims is intended to signify the fins which control the direction of the craft sideways or in a horizontal plane.

In the operation of the electro-optical positional control apparatus in the system shown generally in Fig. 3, a source 27 of modulated light is located in the aircraft 20. The beam of light is projected in the direction of bird 24 so that the light will fall on the lens 68 of the light-receiving section 28 of the electro-optical apparatus in bird 24. The axes of lens 68 and pyramidal prism 70 are aligned in the general direction of the aircraft and, more particularly, in the direction of the beam of modulated light as indicated in Fig. 6. When the bird is positioned and oriented with respect to the aircraft 20 so that the transmitting and receiving coils are properly aligned, a spot of light from the modulated light source 27 is projected on the apex 73 of the pyramidal prism 70 in such a manner that all four faces of the pyramidal prism are equally illuminated. If, due to the turbulent air conditions or other causes, the bird moves or swings to the left of the center of the beam of light, photo cell 72d will receive less light and photo cell 72c will receive more light, resulting in decreased and increased signals, respectively, and vice versa if the bird moves or swings to the right which signals will be transmitted by circuits 80c and 80d to comparison and control circuit 82b. In accordance with the direction of the unbalance, an appropriate control signal is delivered to orienting motor 78 which causes the vertical control fins to turn the bird sideways in the direction of the center of the beam of light. Similarly, if, due to turbulent air conditions or other causes, the bird 24 were to rise or fall or swing vertically out of line with respect to the light beam, the light signal delivered to one of the photo cells 72a and 72b would be decreased and the light signal delivered to the other of the two photo cells would be increased. These unbalanced signals are delivered through circuits 80a and 80b, respectively, to comparison and control circuit 82a. The resulting control signal is delivered to orienting motor 76 which in turn causes the horizontal control fins to return the bird to a position in which the axis of the light signal is again aligned with the axis of prism. Thus, the electro-optical system maintains a relatively constant positional relationship between the transmitting and receiving coils and eliminates positional errors which might otherwise deleteriously affect the detection and measurement of the bodies.

Similarly, in the operation of the electro-optical error correction and positional control system in the arrangement shown generally in Fig. 1, the source 27 of modulated light may be located in the aircraft 10 and a light-receiving section of the electro-optical apparatus may be located in the nose of the first bird 12 so that the first bird 12 containing the transmitting coils may be maintained in substantially constant positional relationship with respect to the aircraft 10. A second light source 39 is provided in the first bird 12 to project a modulated light beam on to a second light-receiving section 40 in the second bird 16 which contains the receiving coils. Accordingly, this second electro-optical control apparatus operates in the same manner to maintain the receiving coils in the second bird 16 in proper alignment with the transmitting coils in the first bird 12. As pointed out hereinbefore, where a high degree of control is not required, it may be sufficient to use the foregoing "second" set of light source and light-receiving sections to control the bird 16 containing the receiving coils from a light source in the bird 12 containing the transmitting coils without controlling the bird 12 containing the transmitting coils from a light source in the aircraft 10. It may be desirable in the arrangement shown generally in Fig. 1 to direct two beams of light from the aircraft either from a single source of modulated light or each beam from a separate source of modulated light in the aircraft. As before, separate light-receiving sections 28 and 40 are located, respectively, in the first bird 12 and in the second bird 16. One of the modulated light beams from the aircraft is directed at the light-receiving section in bird 12 and the other modulated light beam at the light-receiving section in the bird 16. With this arrangement, a relatively constant positional relationship is maintained between each of the birds and the aircraft, thereby providing a relatively constant positional relationship between the two birds and also between the transmitting coils and the receiving coils. As pointed out hereinbefore, it is also possible in the two-bird system depicted generally in Fig. 1 to utilize two electro-optical control systems such that a light source of one system is positioned in the first bird 12 and its light-receiving section is located in the second bird 16 and the light source of the second electro-optical system is located in the second bird 16 with its light-receiving section in the first bird 12. Thus, one of these systems maintains transmitting coil alignment with the receiving coils and the other electro-optical system maintains receiving coil alignment with the transmitting coils. It is understood, of course, that where complete control is not required one of these electro-optical systems can be used alone.

Although the light source need not be modulated, it is desirable that the source of light be modulated and that the electro-optical apparatus have associated therewith filters which permit the passage of only modulated signals in order for the system to be insensitive to all other sources of light such as sunlight and reflections.

The electromagnetic mineral detecting equipment and its operation may be similar to that disclosed in the Cartier et al. U.S. Patent No. 2,623,924, issued December 30, 1952. As described in that patent, the system may employ mutually orthogonal transmitting coils to radiate two frequency-distinguished electromagnetic fields, and a second pair of mutually orthogonally-positioned coils to receive the responses from these coils due to the presence of various conductive bodies, and in which the received signals are combined and amplified by a common amplifier, then separated by filters into the two frequencies and the two frequencies finally combined to indicate the conductive bodies.

It is to be observed that the present invention provides electro-optical apparatus to maintain the transmitting coils in a relatively constant positional relationship with the receiving coils of an airborne electromagnetic prospecting system and thus accurate detection and measurement for and location of ore bodies.

It is also to be observed that the present invention provides an electro-optical error correction and positional control apparatus that may be used in the system of the aforementioned Cartier et al. U.S. patent to maintain the transmitting coils in a relatively constant positional relationship with the receiving coils of the airborne electromagnetic prospecting system of that patent and thus ensure accurate detection and measurement for their location of ore bodies.

Another improved system for electrically detecting and measuring conductive mineral ore bodies by airborne operation is disclosed and described in our application Serial No. 723,004, filed March 21, 1958. As therein disclosed, the electromagnetic coils are located in a single bird suspended from a hovering type aircraft.

Still another improved system for electrically detecting and measuring ore bodies by airborne operation is disclosed and described in our application Serial No. 722,895, filed March 21, 1958. In accordance with the system therein described, three electromagnetic fields are radiated, detected and comparisons made to detect and measure conductive ore, magnetic ore, and mixtures of such ores.

It is further to be observed that the invention provides improved method and apparatus for controlling the positional relationship between airborne craft or vehicles, one of which may be a powered aircraft and one or more of which may comprise a bird or other vehicle towed by another aircraft or otherwise moved through the air and wherein the desired substantially constant positional relationship between the airborne craft or vehicles is attained by an electro-optical means carried by each of the airborne craft whose relative position is to be controlled. It is also to be observed that the electro-optical means in one of said airborne craft may comprise a source of light and means for directing a beam of light from the source in the direction of another airborne craft and the electro-optical means in the latter airborne craft includes electro-optical apparatus responsive to said beam of light to maintain a substantially constant positional relationship between the two airborne craft. Furthermore, the invention provides that another airborne vehicle, moving along with the two airborne craft in flight, may carry means for directing a separate beam of light in the direction of each of two airborne craft whose relative position is to be controlled and the electro-optical means in each of the latter airborne craft comprises electro-optical apparatus responsive to a separate one of said light beams to maintain a substantially constant positional relationship between said two airborne craft.

It is to be observed that, while it is not essential to include a modulator, reduction of spurious signals, such as those that may be picked up in, or caused by, the long tow cable, may be obtained by impression of the received signals on an electrical carrier wave as in the modulator 44 in the bird followed by transmission of the modulated electrical carrier wave to the detecting and comparing circuit 46 wherein the signals due to the one or more electromagnetic fields, including the responses due to earth formations, are detected and separated from the carrier wave.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and appended claims.

We claim:

1. An airborne electromagnetic device adapted for detecting and measuring an ore body comprising, in combination with an aircraft and a bird towed by the aircraft, a pair of energizing coils in the aircraft in mutually orthogonal relationship, a pair of power sources of different frequencies, means to energize said coils from said power sources to radiate electromagnetic fields of different frequencies, a pair of receiving coils mounted in said bird in mutually perpendicular relationship, first frequency discriminating means connected to one of said receiving coils and tuned to one of said frequencies, second frequency discriminating means connected to the other of said receiving coils and tuned to the other of said frequencies, means for feeding the responses of said two frequency discriminating means to said aircraft, means mounted in said aircraft operative to receive and compare said responses from the two frequency discriminating means, and electro-optical means for maintaining a substantially constant positional relationship between said aircraft and said bird.

2. An airborne electromagnetic apparatus in accordance with claim 1 wherein said electro-optical means comprises a source of light located at said aircraft and further comprises a light-responsive system in said bird responsive to the light from said source for controlling the positional relationship of said bird to said aircraft.

3. An airborne electromagnetic apparatus in accordance with claim 2 wherein said light source comprises a source of modulated light.

4. An airborne electromagnetic apparatus in accordance with claim 3 wherein said light-responsive system in said bird comprises a pyramidal prism and a plurality of light sensitive devices associated with said pyramidal prism and positioned to receive equal quantities of light from the pyramidal prism when the bird is in a desired positional alignment with respect to the light from said source.

5. An airborne electromagnetic apparatus in accordance with claim 4 wherein said light-responsive system further includes a filter means in circuit with each of said light sensitive devices for accepting signals due to energization of the light sensitive device by modulated light from said source of light and rejecting signals due to energization of the light sensitive device by other light.

6. An airborne electromagnetic apparatus adapted for detecting and measuring an ore body comprising, in combination with an aircraft and a first bird and a second bird towed by the aircraft, an energizing coil arrangement including at least one energizing coil mounted in the first of said birds to radiate at least one electromagnetic field, a detector coil system including at least one detector coil mounted in said second bird, means for feeding the responses from said detector coil system to detecting and indicating means, and electro-optical apparatus mounted in said birds for maintaining a substantially constant positional relationship between said birds.

7. An airborne electromagnetic apparatus in accordance with claim 6 wherein said electro-optical apparatus comprises a source of light located at said aircraft and further comprises a light-responsive system in each of said birds responsive to the light from said source for controlling the positional alignment of said birds relative to each other.

8. An airborne electromagnetic apparatus in accordance with claim 7 wherein said light source comprises a source of modulated light.

9. An airborne electromagnetic apparatus in accordance with claim 8 wherein said light-responsive system in each of said birds comprises a pyramidal prism and a plurality of light sensitive devices associated with said pyramidal prism and positioned to receive equal quantities of light from the pyramidal prism when the birds are in a desired positional alignment with respect to the light from said source.

10. An airborne electromagnetic apparatus in accordance with claim 9 wherein said light-responsive system in each of said birds further includes filter means in circuit with each of said light-sensitive devices for accepting signals due to energization of the light-sensitive device by modulated light from said source of light and rejecting signals due to energization of the light sensitive device by other light.

11. An airborne electromagnetic system adapted for detecting and measuring a mineral body comprising two airborne vehicles consisting of an aircraft and a bird towed by the aircraft, a first coil arrangement including at least one coil carried by said aircraft and a second coil arrangement including at least one coil in said bird, means connected to one of said coil arrangements to radiate at least one electromagnetic field and means connected to the other of said coil arrangements for receiving and detecting the responses due to the at least one electromagnetic field radiated by the one coil arrangement, means connected to said receiving and detecting means for indicating variations in the received and detected signals and electro-optical means for maintaining a relatively constant positional relationship between said first and said second coil arrangements.

12. An airborne electromagnetic system in accordance with claim 11 wherein said electro-optical means comprises a source of light located at one of said airborne vehicles and means for directing a beam of light from the source in the direction of said other of the airborne vehicles and further comprises electro-optical apparatus in said other of the airborne vehicles responsive to said beam of light to maintain a substantially constant positional relationship of the bird with respect to said beam of light.

13. An airborne electromagnetic system in accordance with claim 12 wherein said light source includes means for modulating said light beam and wherein said electro-optical apparatus includes means responsive only to the modulated light.

14. An airborne electromagnetic system in accordance with claim 13 wherein said electro-optical apparatus includes a pyramidal prism and a plurality of photo cells associated with said prism to receive equal amounts of light when the airborne vehicle containing said electro-optical apparatus is positioned correctly in relation to said beam of light.

15. An airborne electromagnetic system in accordance with claim 14 wherein said electro-optical apparatus further includes means for detecting differences in the light received in said photo cells and further includes control means for controlling the position relative to said light beam of the airborne vehicle containing said electro-optical apparatus.

16. An airborne electromagnetic system in accordance with claim 15 wherein two pairs of photo cells are provided and wherein said means for detecting variations in the light received from said photo cells includes means connected to pairs of said photo cells for detecting the difference in light signal received by one pair of said photo cells and for detecting the difference in light received by the other of said pairs of photo cells.

17. An airborne electromagnetic apparatus as defined in claim 11 in which the coil arrangement carried by the aircraft is in a housing of electrically non-conductive material extending from the rear of the aircraft.

18. An airborne electromagnetic apparatus as defined in claim 16 in which the coil arrangement carried by the aircraft is in a housing of electrically non-conductive material extending from the rear of the aircraft.

19. An airborne electromagnetic apparatus as defined in claim 11 in which the means to radiate at least one electromagnetic field is connected to the coil arrangement mounted in the bird.

20. An airborne electromagnetic apparatus as defined in claim 16 in which the means to radiate at least one electromagnetic field is connected to the coil arrangement mounted in the bird.

21. An apparatus for controlling the positional relationship between airborne craft comprising electro-optical means carried by each of said airborne craft for maintaining a substantially constant positional relationship between the airborne craft.

22. An apparatus in accordance with claim 21 wherein the electro-optical means in one of said airborne craft comprises a source of light and means for directing a beam of light from the source in the direction of another airborne craft and wherein the electro-optical means in the other airborne craft includes electro-optical apparatus responsive to said beam of light to maintain a substantially constant positional relationship between the two craft.

23. An airborne apparatus in accordance with claim 21 wherein an airborne vehicle moving along with other airborne craft in flight carries means for directing a separate beam of light in the direction of each of said other airborne craft and the electro-optical means in each of said other airborne craft comprises electro-optical apparatus responsive to a separate one of said beams of light to maintain a substantially constant positional relationship between said airborne craft.

24. An airborne apparatus in accordance with claim 22 wherein said means for directing light includes means for modulating said light and wherein said electro-optical apparatus includes means responsive only to the modulated light.

25. An airborne apparatus in accordance with claim 22 wherein said electro-optical apparatus includes a pyramidal prism and a plurality of light-sensitive devices associated with said prism to receive equal amounts of light when the airborne vehicle containing the electro-optical apparatus is positioned correctly in relation to its beam of light.

26. An airborne apparatus in accordance with claim 24 wherein said electro-optical apparatus includes a pyramidal prism and a plurality of light-sensitive devices associated with said prism to receive equal amounts of light when the airborne vehicle containing the electro-optical apparatus is positioned correctly in relation to its beam of light.

27. An airborne electromagnetic apparatus adapted for detecting and measuring an ore body comprising an aircraft and a bird towed by the aircraft, a receiving coil system mounted in the bird and including at least one receiving coil in the bird, an amplifier connected to each receiving coil, a modulator in the bird connected to the amplifiers for impressing on an electrical carrier wave the signals received from the amplifiers, conductor means for transmitting the modulated carrier wave from the bird to the aircraft, detecting means in the aircraft to detect and separate from the carrier wave the signals from the amplifiers and means connected to the detecting means for comparing variations in the received and detected signals, and electro-optical means for maintaining a relatively constant positional relationship between the aircraft and the bird.

28. A method for controlling the positional relationship between airborne craft comprising providing a light source moving along in substantially fixed relation with a first airborne craft, directing a beam of light from the moving light source in the direction of a second airborne craft whose position relative to the first airborne craft is to be controlled so that light from the beam falls equally on a surface at the second airborne craft when the two craft are properly aligned and detecting changes in the position of the light from the beam falling on said surface as an indication of misorientation of the two craft, and utilizing this misorientation to maintain a substantially constant positional relationship between the airborne craft.

29. An airborne electromagnetic apparatus in accord with claim 6 wherein said electro-optical apparatus comprises a source of light located at one of said birds and a light-responsive system located at the other bird and responsive to the light from said source for controlling the positional alignment of said birds relative to each other.

30. An airborne electromagnetic apparatus in accordance with claim 29 wherein said electro-optical apparatus comprises another source of light located at said other bird and another light-responsive system located at said one bird and responsive to the light from said other source.

31. An airborne electromagnetic apparatus in accordance with claim 6, there being a source of light located at said aircraft, said electro-optical apparatus in said birds comprising a light-responsive system located at one of said birds responsive to the light from said source, another source of light located at said one bird, and another light-responsive system located at the other bird responsive to the light from said other source.

References Cited in the file of this patent

UNITED STATES PATENTS

| | | |
|---|---|---|
| 2,623,924 | Cartier | Dec. 30, 1952 |
| 2,642,477 | Puranen et al. | June 16, 1953 |
| 2,741,736 | Puranen et al. | Apr. 10, 1956 |
| 2,794,949 | Hedstrom et al. | June 4, 1957 |